(12) United States Patent
Walter et al.

(10) Patent No.: US 8,979,977 B2
(45) Date of Patent: Mar. 17, 2015

(54) DEVICE AND METHOD FOR DEGASSING AQUEOUS MEDIA

(75) Inventors: Fabian Walter, Northeim (DE); Matthias Grabosch, Bovenden (DE); Dennis Groesche, Goettingen (DE)

(73) Assignee: Sartorius Stedim Biotech GmbH, Goettingen (DE)

( * ) Notice: Subject to any disclaimer, the term of this patent is extended or adjusted under 35 U.S.C. 154(b) by 136 days.

(21) Appl. No.: 13/810,595

(22) PCT Filed: May 20, 2011

(86) PCT No.: PCT/EP2011/002520
§ 371 (c)(1),
(2), (4) Date: Jan. 16, 2013

(87) PCT Pub. No.: WO2012/013256
PCT Pub. Date: Feb. 2, 2012

(65) Prior Publication Data
US 2013/0118347 A1    May 16, 2013

(30) Foreign Application Priority Data
Jul. 30, 2010    (DE) .......................... 10 2010 032 736

(51) Int. Cl.
| | |
|---|---|
| *B01D 19/00* | (2006.01) |
| *B01D 53/22* | (2006.01) |
| *B01D 61/02* | (2006.01) |
| *C02F 1/20* | (2006.01) |
| *C02F 1/44* | (2006.01) |

(52) U.S. Cl.
CPC ........ *B01D 19/0063* (2013.01); *B01D 19/0031* (2013.01); *B01D 19/0068* (2013.01);
(Continued)

(58) Field of Classification Search
CPC ........... B01D 19/0031; B01D 19/0063; B01D 19/0068; B01D 61/025; B01D 2311/2653; B01D 2313/16; B01D 2313/18; C02F 1/20; C02F 1/441; C02F 2201/004; C02F 2201/005; C02F 2209/42; C02F 2303/16
USPC ............................ 95/24, 46, 51; 96/6, 7, 417
See application file for complete search history.

(56) References Cited

U.S. PATENT DOCUMENTS

| | | |
|---|---|---|
| 4,302,223 A | 11/1981 | Booth et al. |
| 5,156,739 A | 10/1992 | Dawson et al. |

(Continued)

FOREIGN PATENT DOCUMENTS

| | | |
|---|---|---|
| DE | 198 03 980 | 7/1999 |
| EP | 0 489 403 | 6/1992 |

(Continued)

OTHER PUBLICATIONS
International Search Report of Sep. 29, 2011.

*Primary Examiner* — Jason M Greene
(74) *Attorney, Agent, or Firm* — Gerald E. Hespos; Michael J. Porco; Matthew T. Hespos

(57) ABSTRACT

A device for degassing aqueous media has a first container containing medium to be degassed. A first line connects the first container to a degassing module and a second line connects the degassing module to a second container for receiving the degassed medium. A first non-return valve in the first line prevents backflow from the degassing module to the first container. A hydrophilic membrane in the second line prevents the passage of gas, and a branch between the degassing module and the hydrophilic membrane has a hydrophobic degassing filter for letting out gas. A third line is connected to the first line between the first container and the first non-return valve and to the second line between the second container and the hydrophilic membrane. A second non-return valve in the third line between the first non-return valve and the hydrophilic membrane prevents a flow towards the second container.

10 Claims, 3 Drawing Sheets

(52) U.S. Cl.
CPC .............. *B01D61/025* (2013.01); *C02F 1/20* (2013.01); *B01D 2311/2653* (2013.01); *B01D 2313/16* (2013.01); *C02F 1/441* (2013.01); *C02F 2201/004* (2013.01); *C02F 2209/42* (2013.01); *C02F 2303/16* (2013.01)
USPC ................ 95/46; 95/24; 95/51; 96/6; 96/7; 96/417

(56) References Cited

U.S. PATENT DOCUMENTS

| | | | |
|---|---|---|---|
| 5,221,474 A | 6/1993 | Yokono et al. | |
| 5,670,053 A * | 9/1997 | Collentro et al. | 95/51 |
| 5,989,318 A | 11/1999 | Schroll | |
| 6,120,689 A | 9/2000 | Tonelli et al. | |
| 7,594,801 B2 * | 9/2009 | Udagawa | 95/266 |
| 2011/0192796 A1* | 8/2011 | Smejtek et al. | 210/652 |

FOREIGN PATENT DOCUMENTS

| | | | | |
|---|---|---|---|---|
| JP | 2-52088 | | 2/1990 | |
| JP | 2008-6393 | | 1/2008 | |
| JP | 2008-6393 A | * | 1/2008 | ............... C02F 1/20 |
| JP | 2008-89204 | | 4/2008 | |
| KR | 1020070046360 | | 5/2007 | |

* cited by examiner

DEVICE AND METHOD FOR DEGASSING AQUEOUS MEDIA

BACKGROUND OF THE INVENTION

1. Field of the Invention

The invention relates to a device and method for degassing aqueous media, comprising a first container containing the medium to be degassed, a degassing module connected via a first line to the first container, a second container for receiving the degassed medium connected via a second line to the degassing module, wherein a non-return valve preventing backflow from the degassing module to the first container is arranged in the first line.

2. Description of the Related Art

The invention further relates to a method for degassing aqueous media in which the aqueous medium to be degassed is conveyed from a first container via a non-return valve to a degassing module and the degassed aqueous medium is conveyed to an unpressurised second container after exiting the degassing module.

A device and a method for degassing aqueous media are known in the prior art from JP 2008-006393 A, in which the medium to be degassed is conveyed from a first container via a non-return valve to a degassing module by means of a downstream pump and reverse-osmosis system. The medium exiting the degassing module is conveyed to a second container via a pressure-relief valve.

A disadvantage of this device known in the prior art is that it is not possible to return fluid from the second container to the first container. Thus it is also not possible, for instance, to flush the reverse-osmosis module installed downstream from the first container by intermittently returning medium from the second container. Forgoing the non-return valve installed upstream from the degassing module would lead to the unwanted introduction of gas into the system.

The task of the present invention is thus to improve on the devices and methods for degassing aqueous media known in the prior art so as to create a simple way to return fluid at least intermittently from the second container to the first container without allowing gas to enter the system.

SUMMARY OF THE INVENTION

This task with respect to the device is solved in connection with the preamble of claim 1 in that a hydrophilic membrane preventing the passage of gas is arranged in the second line, that a branch comprising a hydrophobic degassing filter for letting out gas is arranged between the degassing module and the hydrophilic membrane, that a third line is provided, which is connected to the first line between the first container and the first non-return valve and is connected to the second line between the second container and the hydrophilic membrane and that a second non-return valve preventing a flow towards the second container is arranged in the third line, between the first non-return valve and the hydrophilic membrane.

The arrangement of two non-return valves and the combination of a hydrophilic membrane with a hydrophobic degassing filter ensures that the degassing module switches off as soon as negative pressure occurs at the degassing module or its membrane. In systems with varying pressure, this provides a reliable method for preventing gas from entering a system which is to be kept free of bubbles. A device of this type functions without electric volume flow rate control.

According to one preferred embodiment of the invention, the hydrophilic membrane and the hydrophobic degassing filter are arranged in a single component. It is preferable that the hydrophobic degassing filter be designed as a hydrophobic membrane. In this case, the single component can consist of a filter housing if a pleated filter cartridge is arranged with a hydrophilic membrane. As long as this membrane is operated beneath the so-called bubble point, this water-wetted membrane is impervious to gas bubbles. However, in order to keep any gas that may develop away from the membrane, the hydrophobic filter or hydrophobic membrane is arranged in a branch at the filter housing on the filtrate side. Gas, which would hinder the membrane filtration, can easily be removed via this so-called degassing filter.

According to another preferred embodiment of the invention, the degassing module has hydrophobic membrane hollow fibres across which the medium to be degassed can be passed, and negative pressure can be created on the exterior side of the membrane or a carrier gas (strip gas) can be passed across the membrane. As long as the pressure upstream from the first non-return valve is greater than the pressure in the degassing module, the non-return valve remains open and the aqueous medium can be transported through the hydrophilic membrane into the second container.

According to another preferred embodiment of the invention, the first container is part of a reverse-osmosis system and the medium to be degassed is water, which is to be purged of $CO_2$. In this embodiment the reverse-osmosis system has a reverse-osmosis module which can be back-flushed via the third line with medium from the second container. The device according to the present invention has the advantage that it is possible to back-flush the reverse-osmosis module without drawing gas into the system.

According to another preferred embodiment of the invention, the second container has a fill-level sensor which is connected to the reverse-osmosis system via an electronic control unit. The fill-level sensor in the second container enables the back-flushing of the reverse-osmosis module in the reverse-osmosis system depending on the fill level in the second container.

The task with respect to the method is solved in connection with the preamble of claim 8 in that the degassed aqueous medium is conveyed to the second container across a hydrophilic membrane, wherein the gas can escape through a hydrophobic membrane arranged upstream from the hydrophilic membrane, and in that, if necessary, by circumventing the degassing module, the medium can be returned from the second container into the first container via a second non-return valve.

If the medium is to be returned from the second container to the first container, the pump arranged upstream creates negative pressure, which leads to the closing of the first non-return valve. At the same time, the hydrophilic membrane arranged downstream from the degassing module ensures that no gas from the degassing module is drawn into the area of the system downstream from the hydrophilic membrane as a result of the suction pressure present in the third line. Similarly, the second non-return valve ensures that when the pump pressure changes, i.e. in the presence of positive pressure, the medium to be degassed is conveyed through the first non-return valve and the degassing module, and that the medium to be degassed cannot flow directly into the second container.

According to one preferred embodiment of the invention, the medium is conveyed through the first non-return valve to the degassing module via a pump arranged downstream from the first container and via a reverse-osmosis module arranged downstream from the pump, which together form a reverse-osmosis system.

After a predetermined fill level has been reached in the second container, the reverse-osmosis system initiates a flush cycle, in which medium for back-flushing the reverse-osmosis module is drawn in from the second container.

Further details regarding the invention can be obtained from the following detailed description and from the attached drawings, in which examples of preferred embodiments of the invention are depicted.

DETAILED DESCRIPTION OF THE PREFERRED EMBODIMENTS

Figure 1:
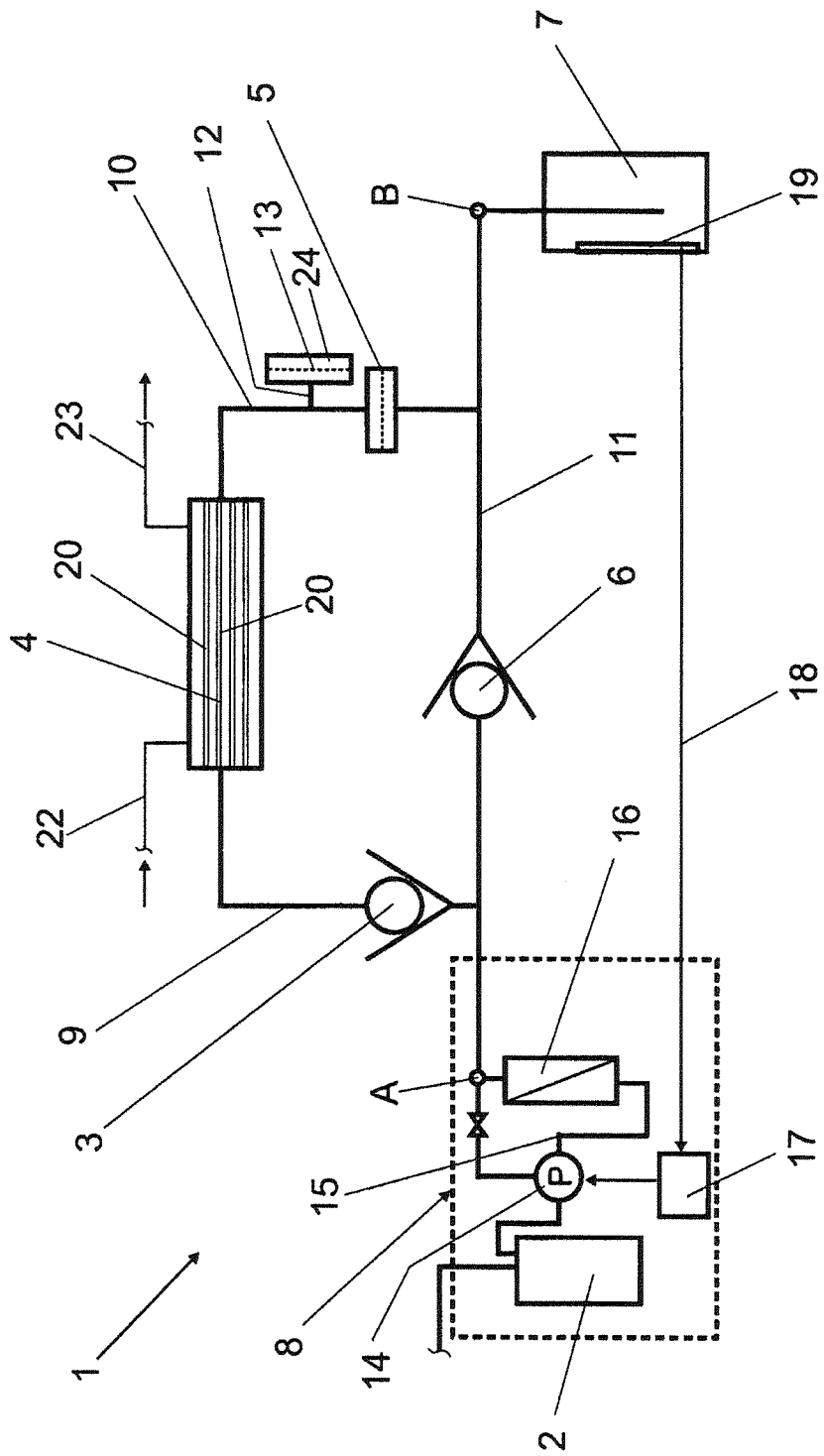
FIG. 1 a block diagram of a device for degassing aqueous media, with a first container which is part of a reverse-osmosis system.

A device 1 for degassing aqueous media consists essentially of a first container 2, a first non-return valve 3, a degassing module 4, a hydrophilic membrane 5, a second non-return valve 6 and a second container 7.

As depicted in the exemplary embodiment in FIG. 1, the first container 2 is part of a reverse-osmosis system 8, via which the first container is connected to line point A of device 1. The first container 2 or first line point A is connected to the degassing module 4 via a first line 9, in which the first non-return valve 3 is arranged. The degassing module 4 is connected to a second line point B and further to the second container 7 via a second line 10, in which the hydrophilic membrane 5 is arranged. A third line 11 connects the first line 9 between the first line point A and the first non-return valve 3 to the second line 10 between the second line point B and the hydrophilic membrane 5.

A hydrophobic degassing filter 24, which contains a hydrophobic membrane 13, is arranged between the degassing module and the hydrophilic membrane 5 via a branch 12 in the second line 10. While the barrier effect of the first non-return valve 3 is directed upstream toward the first container 2, the barrier effect of the second non-return valve 6 is directed downstream toward the second container 7.

While the hydrophilic membrane 5 prevents the passage of gas, the hydrophobic membrane 13 prevents the passage of aqueous media.

The reverse-osmosis system 8 has a pump 14 arranged downstream from the first container 2; this pump is connected via a pump line 15 to a reverse-osmosis module 16, which in turn is connected downstream to the first line point A. The reverse-osmosis system 8 has an electronic control 17, which controls pump 14, among other things, and which is connected by means of a signal line 18 to a fill-level sensor 19 arranged in the second container 7.

The degassing module 4 is designed as a so-called membrane contractor. The aqueous medium to be degassed is conveyed across hydrophobic membrane hollow fibres 20. There is either negative pressure on the outside of the membranes or a carrier gas (strip gas) is conveyed across the membranes. It is also possible, in principle, to use a strip gas in the presence of negative pressure. As a result of the partial pressure of the carbon dioxide $CO_2$ the gas in the aqueous medium passes through the membrane. The aqueous medium or water in the reverse-osmosis system is thus stripped of $CO_2$ and other dissolved gases. The hydrophobic membrane of the membrane hollow fibres 20 serves as a barrier to fluids.

Figure 2:
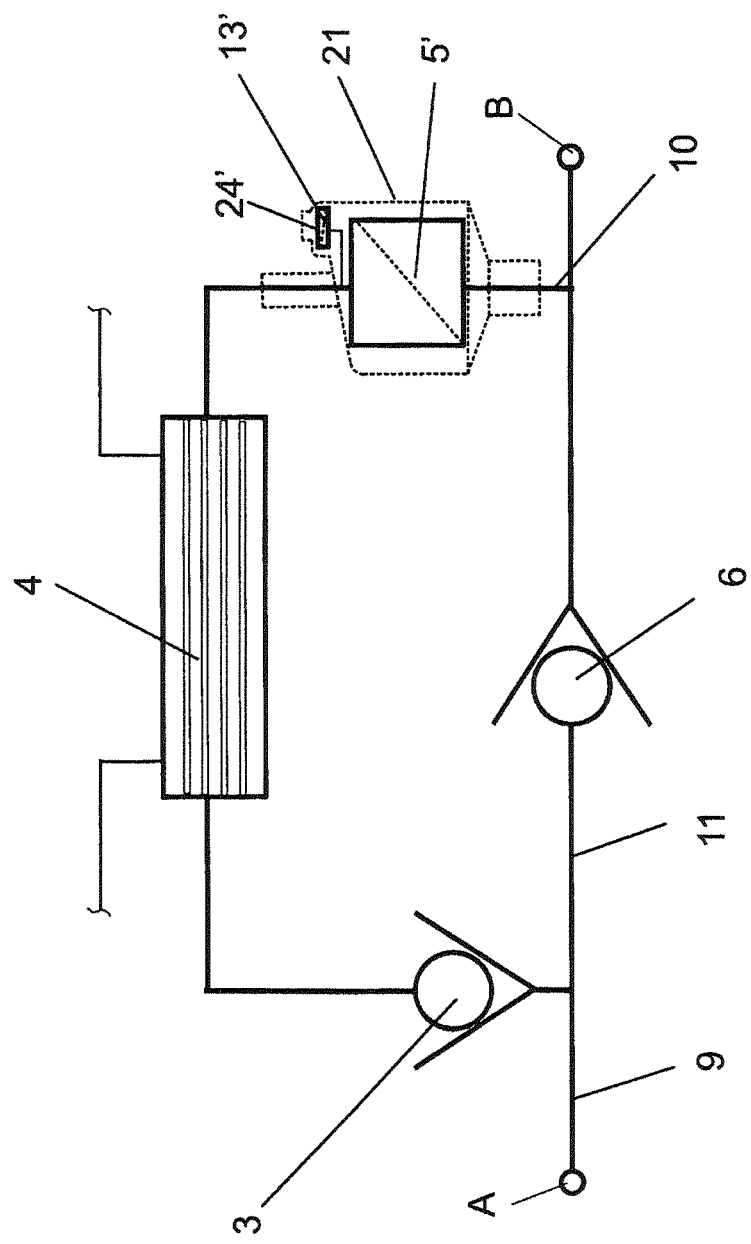
FIG. 2 a further device for degassing aqueous media, showing the section between Points A and B of FIG. 1, in which the hydrophilic membrane and the hydrophobic degassing filter are arranged in a filter housing.

As depicted in the exemplary embodiment in FIG. 2, the hydrophilic membrane 5' and the hydrophobic degassing filter 24' or hydrophobic membrane 13' are arranged in a common filter housing 21.

A strip gas is fed into the degassing module 4 via a supply line 22 and discharged via discharge line 23.

Figure 3:
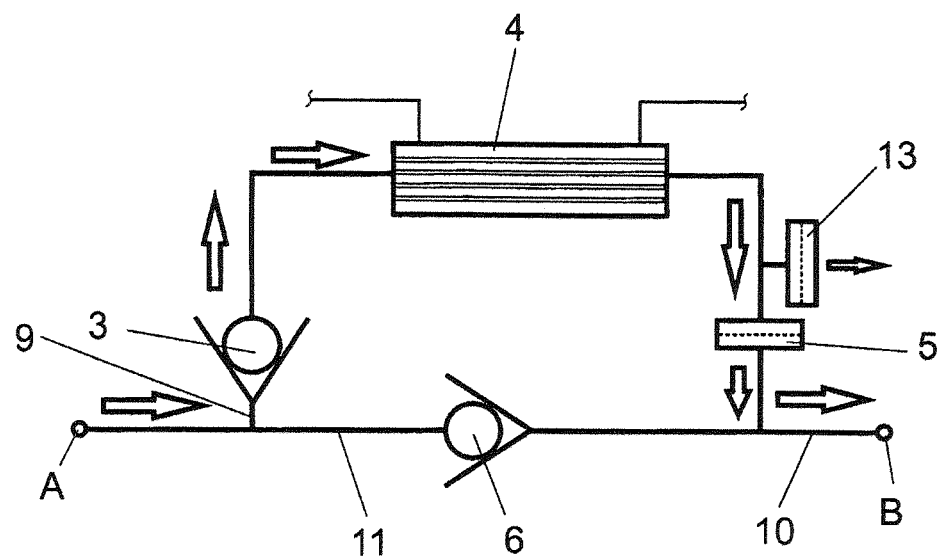
FIG. 3 a block diagram of the device in FIG. 1 between Points A and B with the direction of flow in the degassing state indicated by arrows.

FIG. 3 shows a degassing procedure in which the pressure at Point A is greater than the gas pressure in the degassing module 4, i.e. the aqueous medium flows from Point A via the non-return valve 3 through the degassing module 4 and the hydrophilic membrane 13 to Point B. The hydrophobic degassing filter 13 forms a barrier to the aqueous medium.

Figure 4:
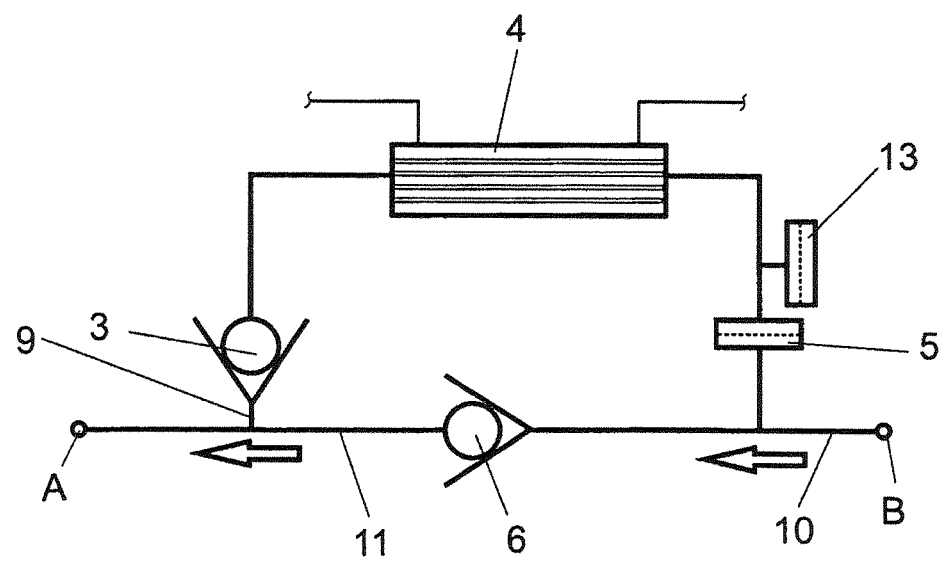
FIG. 4 a block diagram of the device in FIG. 3 with the direction of flow in the back-flushing state indicated by arrows.

The exemplary embodiment in FIG. 4 shows a back-flushing procedure. If the pressure at the first line point A is less than the gas pressure in the degassing module 4, the aqueous medium flows from the second line point B past the degassing module 4 and directly to the first line point A via the second non-return valve 6. This results in negative pressure at the degassing module 4, which draws gas through the hydrophobic membrane hollow fibres 20 of the degassing module. This continues until the gas phase reaches the hydrophilic membrane 5, 5'. Because the hydrophilic membrane 5 has a bubble point of more than 1 bar, this membrane forms a barrier to the gas. Thus, gas bubbles cannot penetrate to the first line point A or beyond.

The invention claimed is:

1. A device (1) for degassing aqueous media, comprising:
    a first container (2) containing the medium to be degassed,
    a degassing module (4) connected via a first line (9) to the first container (2),
    a second container (7) for receiving the degassed medium connected via a second line (10) to the degassing module (4),
    a first non-return valve (3) in the first line (9) for preventing backflow from the degassing module (4) to the first container (2),
    a hydrophilic membrane (5, 5') arranged in the second line (10) for preventing passage of gas,
    a branch comprising a hydrophobic degassing filter (24, 24') arranged between the degassing module (4) and the hydrophilic membrane (5) for letting out gas,
    a third line (11) connected to the first line (9) between the first container (2) and the first non-return valve (3) and connected to the second line (10) between the second container (7) and the hydrophilic membrane (5), and
    a second non-return valve (6) arranged in the third line (11), between the first non-return valve (3) and the hydrophilic membrane (5) for preventing a flow toward the second container (7).

2. The device of claim 1, wherein
    the hydrophilic membrane (5') and the hydrophobic degassing filter (13') are arranged in a common filter housing (21).

3. The device of claim 1, wherein
    the hydrophobic degassing filter (24) is a hydrophobic membrane (13).

4. The device of claim 1, wherein
    the degassing module (4) has hydrophobic membrane hollow fibres (20) across which the medium to be degassed can be passed, wherein negative pressure can be created on the exterior side of the membrane or a carrier gas can be passed across the membrane.

5. The device of claim 1, wherein
the first container (2) is part of a reverse-osmosis system (8) and the medium to be degassed is water, which is to be purged of $CO_2$.

6. The device of claim 5, wherein
the reverse-osmosis system (8) has a reverse-osmosis module (16) which can be back-flushed via the third line (11) with medium from the second container (7).

7. The device of claim 5, wherein
the second container (7) has a fill-level sensor (19) which is connected to the reverse-osmosis system (8) via an electronic control unit (17).

8. A method for degassing aqueous media comprising:
conveying the aqueous medium to be degassed from a first container (2) via a non-return valve (3) to a degassing module (4);
conveying the degassed aqueous medium from the degassing module (4) across a hydrophilic membrane (5) to an unpressurised second container (7);
allowing the gas to escape through a hydrophobic membrane (13) arranged upstream from the hydrophilic membrane (5); and
selectively circumventing the degassing module (4) so that medium can be returned from the second container (7) into the first container (2) via a second non-return valve (6).

9. The method of claim 8, further comprising
conveying the medium via a pump (14) arranged downstream from the first container (2) and via a reverse-osmosis module (16) arranged downstream from the pump (14) and via the first non-return valve (3) to the degassing module (4).

10. The method of claim 9, further comprising
using the reverse-osmosis system (8) for initiating a flush angle after a predetermined fill level has been reached in the second container (7), in which medium for back-flushing the reverse-osmosis module (16) is drawn in from the second container (7).

* * * * *